(12) United States Patent
Nelson et al.

(10) Patent No.: US 7,079,976 B2
(45) Date of Patent: Jul. 18, 2006

(54) DENSE OBJECT DETECTION SYSTEM AND METHOD

(75) Inventors: Carl V. Nelson, Derwood, MD (US); Mary R. Keller, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/924,603

(22) Filed: Aug. 24, 2004

(65) Prior Publication Data

US 2005/0072219 A1  Apr. 7, 2005

Related U.S. Application Data

(60) Provisional application No. 60/509,166, filed on Oct. 7, 2003.

(51) Int. Cl.
*G01M 1/00* (2006.01)

(52) U.S. Cl. .................................................... 702/173

(58) Field of Classification Search ................. 702/173
See application file for complete search history.

(56) References Cited

U.S. PATENT DOCUMENTS

| | | | |
|---|---|---|---|
| 2,559,718 | A | 7/1951 | Goodlett et al. |
| 3,746,844 | A | 7/1973 | Azum et al. |
| 5,493,517 | A | 2/1996 | Frazier |
| 6,255,654 | B1 | 7/2001 | Verbinski et al. |
| 6,552,346 | B1 | 4/2003 | Verbinski et al. |
| 2004/0073808 | A1* | 4/2004 | Smith et al. ................ 713/200 |

OTHER PUBLICATIONS

Technology exposing trouble, Michael Fickes, Mar. 7, 2003, p. 1-6.*

* cited by examiner

*Primary Examiner*—Bryan Bui
*Assistant Examiner*—Tung S. Lau
(74) *Attorney, Agent, or Firm*—Francis A. Cooch

(57) ABSTRACT

Provided herein is a method and system for detecting hidden dense objects in cargo containers including at least a cargo container platform with two-dimensional sensor arrays in juxtaposition therewith. The system further includes a process that estimates a weight and mass distribution data from a cargo manifest for the cargo container and available historical information about the cargo container. The historical weight and mass distribution is compared to the actual weight and mass distribution measured by the sensor arrays to detect discrepancies which will identify the tested cargo container as suspect and in need for further investigation.

21 Claims, 2 Drawing Sheets

DENSE OBJECT DETECTION SYSTEM AND METHOD

CROSS-REFERENCE TO RELATED APPLICATIONS

This application claims the benefit of U.S. Provisional Application No. 60/509,166 filed Oct. 7, 2003, the contents of which are incorporated herein by reference.

BACKGROUND OF THE INVENTION

1. Field of the Invention

The present invention relates generally to a method and system for detecting hidden dense objects in cargo containers, and more specifically to the detection of hidden dense objects using a comparison of actual and anticipated weight and mass distribution of individual cargo containers.

2. Description of the Related Art

Every year approximately seven million cargo containers carrying a large variety of goods originating everywhere in the world, arrive into the ports of the United States of America. At present only a minute percentage of these cargo containers are screened by various governmental agencies. Recent terrorism and homeland security concerns over the possibility of weapons of mass destruction (WMD) or materials used in making WMD, e.g., a so called "dirty bomb" (a conventional bomb made using radioactive material for the purpose of killing or infecting large numbers of people), being smuggled into the country, have highlighted the need and intensified the search for a system and method of screening this immense number of cargo containers.

In addition to not being able to screen large amounts of cargo containers, present technology such as nuclear detectors is typically used to sense possible radiological material inside the cargo containers. However, if the radiological material is well shielded, for example, by lead or other radiologically dense material, the nuclear detector may not detect the lethal contraband even if the container is screened. Accordingly, what is needed is a device that will sense anomalously dense materials inside the cargo or other types of containers, such as, for example, freight train cars, and screen a large number of containers in a very short time, for possible further investigation, for example, via an X-ray analysis, when the anomalously dense materials are detected in a cargo container being investigated.

SUMMARY OF THE INVENTION

In accordance with one embodiment of the present invention, a system for detecting hidden dense objects in a plurality of cargo containers is provided, the system comprising at least one cargo container platform capable of holding at least one cargo container; at least one sensor array in juxtaposition with the at least one cargo container platform, and a computing device for (i) receiving actual information from the at least one sensor array, the actual information including the actual weight and mass distribution of each cargo container of the plurality of cargo containers, (ii) retrieving available historical information, e.g., a cargo manifest for each cargo container, about the cargo container and its content, (iii) estimating information including historical weight and mass distribution of the cargo container, and (iv) comparing the actual and estimated information to detect dense object anomalies, wherein the presence of the dense object anomalies identifies the cargo container as subject to further testing. The historical information being provided to or retrieved by the computing device may be stored across a network, e.g., the Internet.

In accordance with another embodiment of the present invention, a method for detecting hidden dense objects in a plurality of cargo containers is provided, the method comprising positioning at least one cargo container on a cargo container platform, the cargo container platform having at least one sensor array in juxtaposition therewith for providing actual information including an actual weight and mass distribution of the cargo container to a computing device; and retrieving available historical information about the cargo container and its content. The available historical information can be stored in a database, reachable over a network or sent directly to the computing device via, e.g., a network, a modem, a wireless device, a diskette, a compact disc, or a digital video disc.

The method advantageously estimates information including historical weight and mass distribution of the cargo container; and compares the actual and estimated information to detect dense object anomalies, wherein the presence of the dense object anomalies identifies the cargo container as being subject to further testing.

BRIEF DESCRIPTION OF THE DRAWINGS

Various embodiments are described below with reference to the drawings wherein.

DESCRIPTION OF THE PREFERRED EMBODIMENTS

Figure 1:
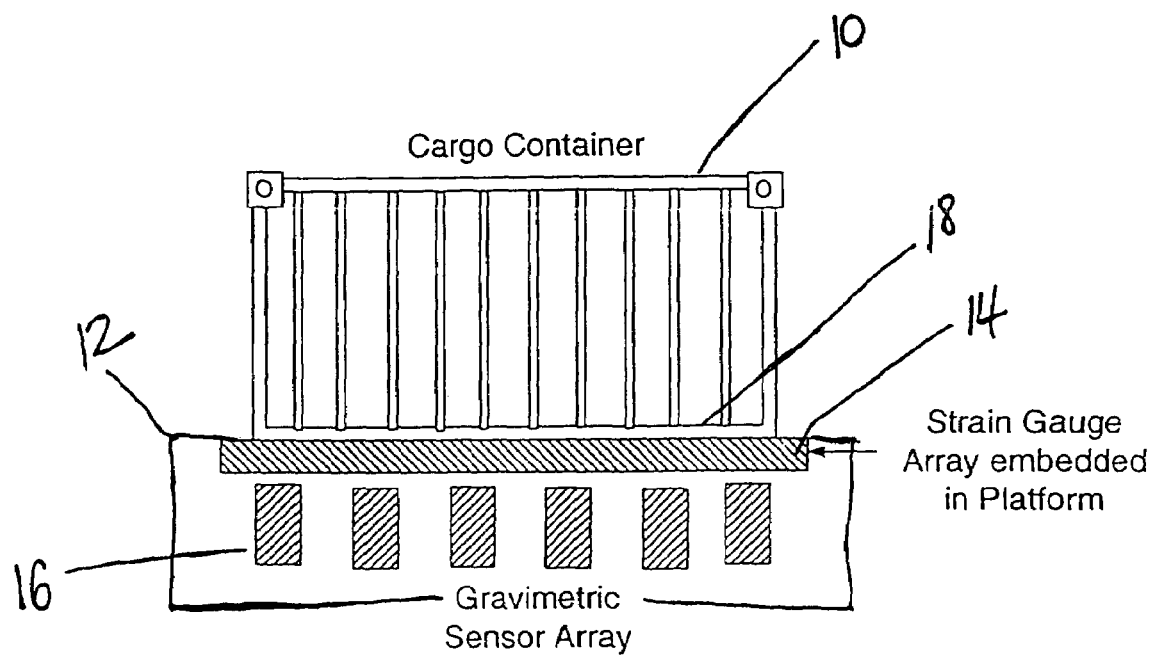
FIG. 1 is a diagram of the hidden dense object detector (DOD) system according to an embodiment of the present invention.

Preferred embodiments of the present invention will be described herein below with reference to the accompanying drawings, wherein the same components or parts thereof will be represented with the same reference numerals or symbols to avoid any redundancy or repetition, if available. In the following description, well-known functions or constructions are not described in detail since they would obscure the invention in unnecessary detail.

The present invention provides a hidden dense object detector system including at least a cargo container platform with a two-dimensional sensor array in juxtaposition therewith. The cargo container platform may be, for example, a conveyor type system such as a conveyor belt or a weighing station over which cargo containers are generally rolled or trucked. Alternatively, the cargo container platform can be, for example, one that is used to test railroad cars as they are rolled, one-by-one, over the platform. The cargo container platform further includes arrays of sensors such as, for example, strain gauges, gravimeters and the like, for determining the weight and mass distribution of the cargo containers and their contents. As one skilled in the art will readily appreciate, the array of sensors can be, for example, independently mounted on and/or embedded inside the platform by known techniques.

Furthermore, the present invention also provides a method that uses statistical methods to estimate historical weight and mass distribution data using a cargo manifest and available historical information about the cargo container. The method then looks for dense object anomalies by comparing the identified data with that which was sensed by the inventive cargo container platform.

Referring now to FIG. 1 which generally illustrates a hidden dense object detector (DOD) of an embodiment of the present invention. As shown in FIG. 1, cargo container 10 is placed on cargo container platform 12. Platform 12 includes a two dimensional array of weight sensing devices 14, e.g., strain gauges, and a two dimensional array of mass sensing devices 16, such as gravimeters. Each of the array of weight sensing devices 14 and the array of mass sensing devices 16 are independently mounted, for example, on and/or inside (i.e., emdedded) platform 12.

If anomalously dense materials are present in container 10, then the weight and mass distribution will be detected by weight and mass sensing devices 14 and 16 as described hereinbelow. The weight sensing devices 14 will sense that some portion of the container's floor 18 is under more strain/stress than other sections of floor 18. The mass sensing devices 16 will sense that the container has a spatially compact mass and/or weight distribution excess referred to afterward as a "hot spot". If two measured "hot spots" are correlated, then potentially there is a mass abnormality. Strain/stress sensing can also include remote measuring techniques that are known in the art, for example, a laser strain/stress sensing. It is to be understood by those skilled in the art other methods are available for achieving the above-described measurement.

The feasibility of measuring the weight or stress distribution is easily within the state-of-the-art of the currently available strain gauge technology. To test the feasibility of gravimetric sensing, a simple calculation for detecting an anomalously dense material in cargo container is provided. For ease of calculations, a one meter (1 m) radius sphere of lead 11,340 kilograms per cubic meter encased in a container having an interior height of 5 m will be used. It is assumed that the rest of the interior is composed of carbon. To address the "worst case scenario" for detection, where the density difference between the anomalous mass and the rest of the container contents is the least, the calculations assume the carbon is in its densest form, i.e., diamond, which has a density of 3,520 kilograms per cubic meter. Expected container contents including, for example, clothing, paper, cardboard or electronic goods, would have a much lower density with a correspondingly higher density difference.

For illustrative purposes, it is assumed that the lead sphere is suspended in the center of the 5 m interior space of the cargo container, meaning that it is suspended 2.5 meters below the sensor, and the rest of the interior is filled with carbon materials of density not exceeding that of diamond. Then the change in sensed mass difference is on the order of 0.035 milligrams. Standard gravity meters have a resolution of about 0.001 milligals and an accuracy of about 0.01 milligals. The detectable density difference, described above, is on the order of 35 times the sensitivity of standard sensors. This proves that the gravimetric mass detection is feasible using the currently existing technology.

It is also noted that when cargo containers are shipped, cargo manifests and bills of lading are prepared for each container. Using this information, it is rather rudimentary to estimate the historical weight and mass distribution of the container. If that historical weight and mass distribution does not correspond to the actual weight and mass distribution calculated by the inventive DOD, the container should be flagged for more thorough testing.

The actual measurements taken by weight and mass sensing devices 14 and 16 are stored in digital storage, for example, in a database, managed by a computing device. Alternatively, the actual measurements may be provided to a computing device for direct processing. The processing, as described below, is performed in order to compare the actual measurements with estimated measurements of the weight and mass distribution of cargo containers.

Figure 2:
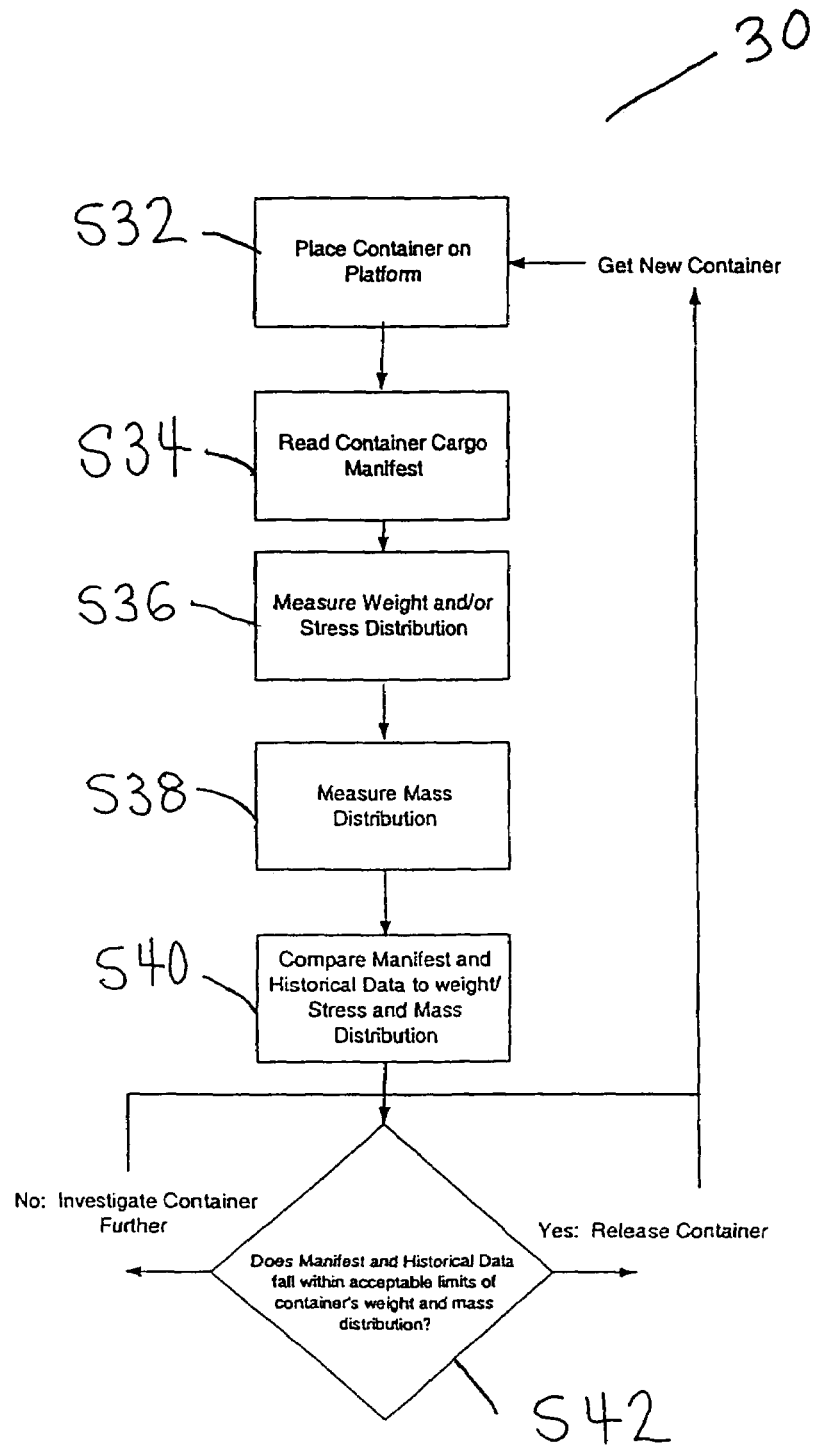
FIG. 2 is a flowchart of a method of an embodiment of the present invention that includes statistical techniques.

FIG. 2 generally illustrates a method 30 of the present invention that includes at least statistical techniques used for detecting dense objects. Such statistical techniques are known in the art and therefore will not be described here in detail. Statistical techniques can be used in conjunction with historical data about the cargo container, e.g., the cargo manifest and the weight and mass distribution of container 10 (FIG. 1), to screen container 10, in determining the necessity of further testing via other techniques, e.g., X-ray or physical inspection of the interior of the container.

Method 30 advantageously compares a historical weight and mass distribution with the materials in the container that are identified by the historical data, such as the cargo manifest. For example, if the cargo container is received from a country identified as having potential terrorist connections and the manifest states that the container has clothing or other relatively light weight goods, such as electronics, and the weight and mass distribution of the container falls outside some statistically calculated "normal" historical weight and mass distribution parameters, then the container will be flagged for further testing such as X-ray or physical inspection.

In step S32, container 10 (FIG. 1) is placed on platform 12 (FIG. 1). The historical data such as the container's manifest will be examined in step S34 to estimate the historical weight, stress and mass distribution of the container and its contents. The actual weight and stress distribution of the container will be measured in step S36 and its mass distribution is measured in step S38. In step S40, the actual measurements obtained in steps S36 and S38 are compared to the historical or estimated measurements calculated in step S34. Finally, in step S42, a determination can be made if any discrepancy in comparison of step S40 falls within acceptable limits. As one skilled in the art will readily appreciate, such limits may be adjusted based on multiple factors including, for example, the current weather, barometric pressure, country of origin, the level of terrorism alert, i.e., heightened security condition, etc. If it is determined in step S42 that the limits are acceptable, the container is released and allowed to proceed to its destination. Otherwise, the container is investigated further, using more stringent technology, which is not addressed by the present application.

The above described processing can be performed on a computing device having a central processing unit (CPU), memory, mass storage, network connectivity, peripherals, and other components commonly associated with a computing device. The historical information may reside on the processing computing device or any other database computing device connected to the Internet, to which the processing computing device has a connection. The cargo manifest, including the weight and mass distribution information is stored in digital form and is available, i.e., reachable over a network, to the processing computing device. The network may be any local or wide area networks including, for example, the Internet and the wireless Internet.

Alternatively, the historical information may be sent directly (point-to-point) to the processing computing device via, e.g., a modem, wireless means (e.g. Blackberry™ or other similar devices), or carried over by a tape, a diskette, a compact disc, a digital videodisc, etc.

The inventive cargo screening method is faster and more economical to deploy in the field, as compared to more intrusive methods such as, for example, X-ray and inspection, and can be performed on a very large number of, if not all, cargo containers entering this country. To speed the detection and screening process, without undue delay in processing the container, the DOD may be integrated into a conveyor belt-like device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for detecting hidden dense objects in a plurality of cargo containers, the system comprising:
    (a) at least one cargo container platform capable of holding at least one cargo container;
    (b) at least one sensor array in juxtaposition with the at least one cargo container platform; and
    (c) a computing device for receiving actual information from the at least one sensor array, the actual information including the actual weight distribution and mass distribution of each cargo container of the plurality of cargo containers, retrieving available historical information about the cargo container and its content, estimating information including a historical weight distribution and mass distribution of the cargo container, and comparing the actual and estimated information to detect dense object anomalies,
    wherein the presence of the dense object anomalies identifios the cargo container as subject to further testing.

2. The system of claim 1, wherein the cargo container platform further comprises a conveyor system selected from one of a conveyor belt on which the cargo containers are moved over the cargo container platform, a weighing station over which cargo containers are rolled or trucked, a rail system over which cargo containers are roiled as railroad cars.

3. The system of claim 1, wherein the at least one sensor array is embedded in the cargo container platform.

4. The system of claim 1, wherein the at least one sensor array is mounted on the cargo container platform.

5. The system of claim 1, wherein the at least one sensor array comprises one or more strain gauges, gravimeters and combinations thereof.

6. The system of claim 5, wherein the one or more strain gauges and gravimeters are independently mounted on or embedded in the cargo container platform.

7. The system of claim 1, wherein the available historical information is provided in digital form.

8. The system of claim 1, wherein the available hktorical information is stored in a database in the computing device, reachable over a network or sent directly to the computing device via a modem, a wireless device, a diskette, a compact disc or a digital video disc.

9. The system of claim 8, wherein the network is the Internet.

10. The system of claim 8, wherein the available historical information is provided in a cargo manifest in digital form.

11. A method for detecting hidden dense objects in a plurality of cargo containers, the method comprising steps of:
    positioning at least one cargo container on a cargo container platform, the cargo container platform having at least one sensor array in juxtaposition therewith for providing actual information including an actual weight distribution and mass distribution of the cargo container to a computing device;
    retrieving available historical information about the cargo container and its contents;
    estimating information including a historical weight distribution and mass distribution of the cargo container; and
    comparing the actual and estimated information to detect dense object anomalies, wherein the presence of the dense object anomalies identifies the cargo container as being subject to further testing.

12. The method of claim 11, wherein the cargo container platform further comprises a conveyor system selected from one of a conveyor belt on which the cargo containers are moved over the cargo container platform, a weighing station over which cargo containers are rolled or trucked, a rail system over which cargo containers are rolled as railroad cars.

13. The method of claim 11, wherein the at least one sensor array is embedded in the cargo container platform.

14. The method of claim 11, wherein the at least one sensor array is mounted on the cargo container platform.

15. The method of claim 11, wherein the at least one sensor array comprises one or more strain gauges, gravimeters and combinations thereof.

16. The method of claim 15, wherein the one or more strain gauges and gravimeters are independently mounted on or embedded in the cargo container platform.

17. The method of claim 11, wherein the available historical information is provided in a cargo manifest in digital form.

18. The method of claim 11, wherein the available historical information is stored in a database in the computing device, reachable over a network or sent directly to the computing device via a modem, a wireless device, a diskette, a compact disc or a digital video disc.

19. The method of claim 18, wherein the network is the Internet.

20. The method of claim 11, wherein the available historical information is stored in a database, reachable over a network.

21. The method of claim 11, wherein the available historical information is sent directly to the computing device.

* * * * *